(12) United States Patent
Lehmann et al.

(10) Patent No.: US 6,227,709 B1
(45) Date of Patent: May 8, 2001

(54) BEARING SHELL WITH RETAINING CAM AND METHOD FOR PRODUCTION THEREOF

(75) Inventors: Uwe Lehmann, Wörrstadt; Michael Lill, Wiesbaden, both of (DE)

(73) Assignee: Glyco-Metall-Werke Glyco B.V. & Co. KG, Wiesbaden (DE)

( * ) Notice: Subject to any disclaimer, the term of this patent is extended or adjusted under 35 U.S.C. 154(b) by 0 days.

(21) Appl. No.: 09/051,734
(22) PCT Filed: Jul. 11, 1997
(86) PCT No.: PCT/DE97/01508
  § 371 Date: Apr. 20, 1998
  § 102(e) Date: Apr. 20, 1998
(87) PCT Pub. No.: WO98/05878
  PCT Pub. Date: Feb. 12, 1998

(30) Foreign Application Priority Data

Aug. 6, 1996 (DE) .............................................. 196 31 663

(51) Int. Cl.$^7$ ................................ F16C 33/04; F16C 9/02
(52) U.S. Cl. ........................................... 384/294; 384/430
(58) Field of Search .................................. 384/216, 288, 384/294, 296, 429, 430, 432, 433, 434, 906

(56) References Cited

U.S. PATENT DOCUMENTS

| 2,124,060 | * | 7/1938 | Gilman ............................. 384/294 X |
| 3,576,353 | * | 4/1971 | Barker et al. ........................ 384/430 |
| 4,845,817 | * | 7/1989 | Wilgus ............................. 384/288 X |
| 5,727,885 | * | 3/1998 | Ono et al. ........................ 384/430 X |

FOREIGN PATENT DOCUMENTS

| 1477052 | * | 3/1984 | (DE) . |
| 3230700 | * | 3/1984 | (DE) . |

* cited by examiner

Primary Examiner—Thomas R. Hannon
(74) Attorney, Agent, or Firm—Reising, Ethington, Barnes, Kisselle, Learman & McCulloch, P.C.

(57) ABSTRACT

A bearing shell with at least one retaining cam which, when looking down on the partial surface of the bearing shell, has a rectangular external contour line and an indentation on the inside, the indentation being at its largest around the center (M) of the cam. The indentation, when looking down on the partial surface, has a curved contour line. The cam is made by being either hammered or pressed using a rounded blade.

7 Claims, 3 Drawing Sheets

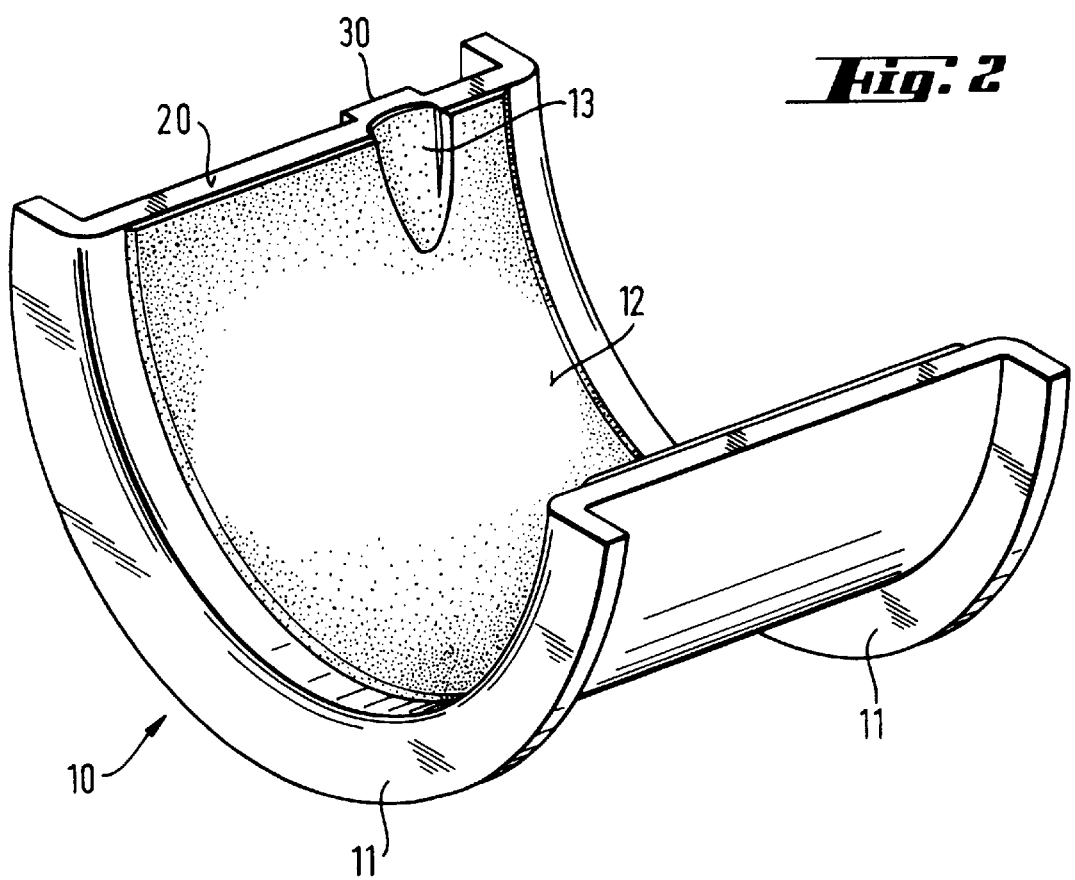

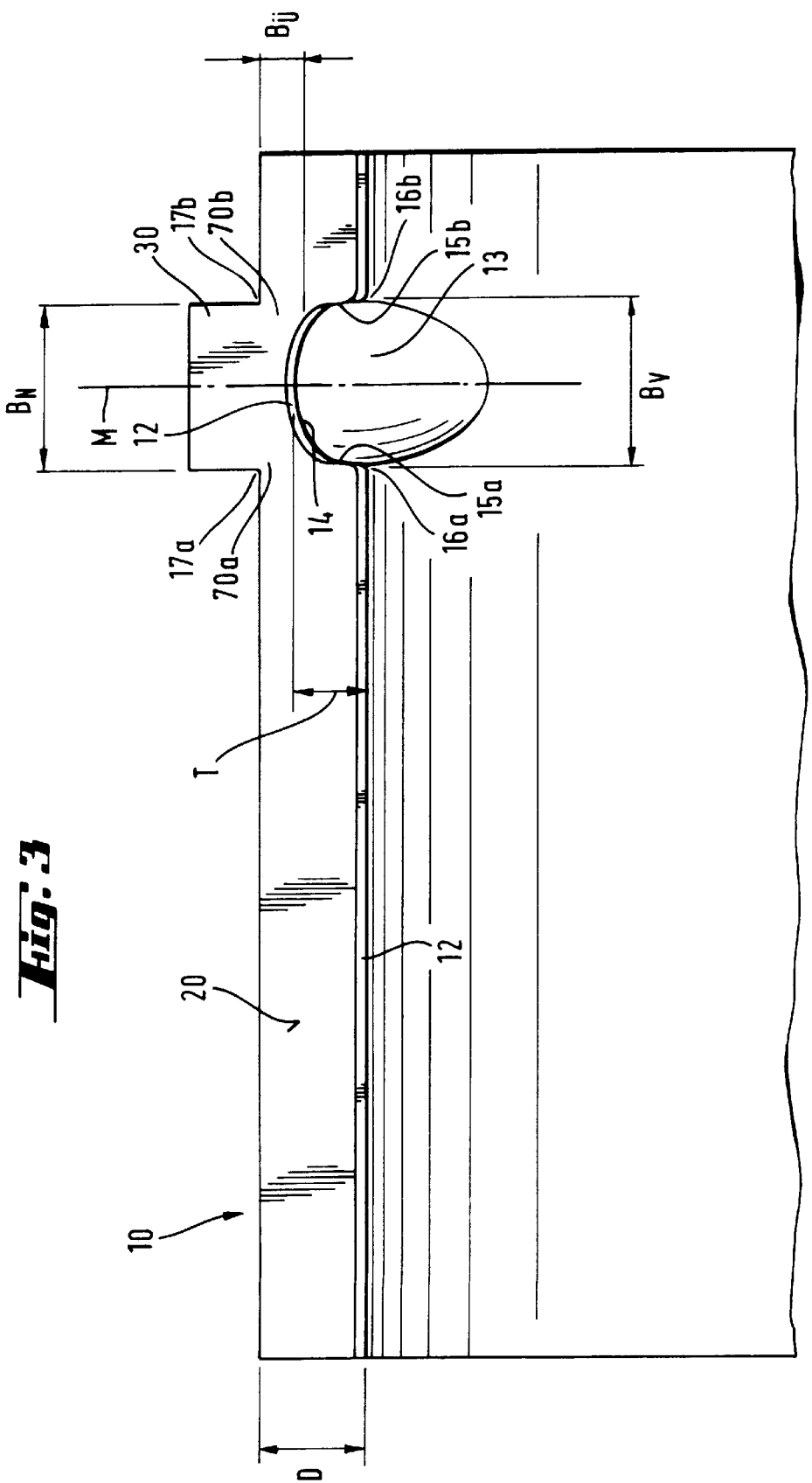

BEARING SHELL WITH RETAINING CAM AND METHOD FOR PRODUCTION THEREOF

BACKGROUND OF THE INVENTION

1. Field of the Invention

The invention relates to a bearing shell with at least one retaining cam, which comprises an outer contour which is rectangular when the partial surface of the bearing shell is viewed from above and an indentation on the inside of the bearing shell. The invention also relates to a method of producing cams in bearing shells by pressing outwards into a rectangular die a small portion of the bearing shell wall in the area of the partial surface.

2. Description of Related Art

Retaining cams on bearings shells have the task of easing installation of the bearing shell, by defining the installation position in the bearing housing in cooperation with a recess provided therein. When the partial surface 2 of the bearing shell 1 is viewed from above, such retaining cams 3, known for example from DE-AS 1477052, comprise, as shown in FIG. 1, a rectangular outer contour and a rectangular inner contour. The retaining cam 3 is provided so as to position itself in the milled-out portion 5 on insertion into the bore in the bearing housing 4. In the region of the retaining cam 3, the partial surface 2 then lies in the plane of the partial surface 6 of the bearing housing and then rests against the closed parting plane of the second housing half. This not only results in fixing of the installation position but also in the prevention of rotation of the bearing shell within the housing bore during operation.

The retaining cams 3 may be beaten by means of a blade or, as described in DE-AS 1477052, produced in the gap in a roll pair. However, a disadvantage of all known retaining cams is the small transition area 7a,b between the cam 3 and the adjacent bearing wall. The transition area should be understood to mean the area between the base 8a,b of the cam and the indentation 9. In general, the material of the bearing shell is torn or even sheared off in this area, such that material detachment may occur there during operation. To prevent this, in many instances the inside of the bearing shell is adjusted by milling in the area of the indentation 9. In the case of heavily loaded bearings, the cam may possibly tear away under the action of the forces and vibrations arising during operation owing to the only slight connection with the rest of the bearing shell in the upper area.

It has therefore already been proposed to provide pin-shaped elevations in the bearing housing, which engage in corresponding bores in the bearing shell. This is described, for example, in the Clevite brochure "Mechanics Engine Bearing Reference Manual, First Edition, 1954". This solution is only possible, however, with bearing housings which have a suitably thick wall.

U.S. Pat. No. 2,124,060 discloses a retaining cam with round inner and outer contour, which projects only slightly outwards, however, such that it cannot adequately fulfill its function as a rotation prevention device. In the production of round cams which do project sufficiently far outwards, it has been found that the nominal width, which is predetermined by the milled-out portion in the bearing housing, cannot be maintained because of gentle transition areas. It is thus impossible to locate the bearing shell cleanly against the housing and position and fix it with axial precision.

These disadvantages may be prevented if the cam is produced only in the area of the bearing backing, in order thereby not to damage the running surface. DE 3230700 C2 discloses so-called upset cams, wherein, by the exertion of pressure directed perpendicularly at a radially outer, axially defined area of the partial surface and with appropriate bracing at the bearing inner surface, material is displaced radially outwards. Between the indentation arising through material displacement and the inner surface there remains a supporting strip of material. This method may, however, only be used with thick bearing shells with wall thicknesses >2 mm.

Since developments in engine construction are moving in the direction of thinner walled, i.e. lighter, bearing housings and also of thinner bearing shells, which additionally are exposed to ever higher loads, for instance speeds of up to 17000 rpm in racing, alternatives to the known solutions are being sought.

SUMMARY OF THE INVENTION

The object of the present invention is therefore to provide a bearing shell whose retaining cams exhibit greater stability. Another object of the invention is to provide a method by which retaining cams may be produced which are more stable and which may possibly, for instance depending on the flow behaviour of the composite bearing material used, obviate the need for further processing of the inside of the bearing shell.

This object is achieved with a bearing shell according to claim 1. The production method constitutes the subject matter of claim 7. Advantageous embodiments are described in the subclaims.

The invention comprises combining a rectangular outer contour of the cam with an inner contour which, in contrast to the prior art, is not similarly rectangular, but rather follows such a course that the indentation is at its greatest in the centre of the cam. A contour shape is preferred, in which the indentation increases continuously in degree from the edge to the center M of the cam.

The rectangular outer contour has the advantage that existing dies may be used for production and in particular that the sufficiently large locating surface of the cam ensures clean axial positioning and fixing in the bearing housing as well as, in special cases such as racing engines, the prevention of rotation. The inner contour according to the invention ensures that a large and in particular undamaged transition area is present which guarantees stability of the cam even under heavy loading. The depth of the indentation in the center of the cam may be greater than is the case with conventional cams, which is not disadvantageous, however, insofar as the loading of the cam is at its greatest not in the center but in the edge area, where a correspondingly large transition area remains. This embodiment of the retaining cam is thus also possible in particular in the case of thin bearing shells with a wall thickness amounting to <2 mm.

The indentation preferably increases continuously from its edge to the center of the cam. The indentation may in principle have any contour, for example it may even be triangular. However, a round, advantageously arcuate, contour is preferred.

The indentation may also comprise a round portion and straight lateral portions. The lateral portions do not in this instance extend over half the bearing shell wall thickness, such that a sufficiently large transition area remains.

The width $B_v$ of the indentation preferably corresponds approximately to the width $B_n$ of the cam.

The method of producing retaining cams provides for the production of an indentation, by outwards pressing, which is greatest in the area of the center of the cam. The material displacement is thus at its slightest in the edge area of the indentation, such that the retaining cam cannot tear away. Detachment of the bearing material thus does not occur at all or occurs only to a limited degree, depending on the flow behaviour of the composite bearing material used, such that further processing, i.e. milling out and removal of the bearing material, is unnecessary. This method is gentle on the material while at the same time a stable cam is produced which withstands heavy loads when in operation.

The outwards pressing is preferably effected by means of a round blade.

The indentation may be beaten or embossed.

BRIEF DESCRIPTION OF THE DRAWINGS

Exemplary embodiments of the invention are explained in more detail below with the aid of the drawings, in which:

FIG. 2 is a perspective representation of a bearing shell according to the invention and FIG. 3 is a plan view of the partial surface of the bearing shell shown in FIG. 2.

DETAILED DESCRIPTION OF THE PREFERRED EMBODIMENTS

Figure 1:
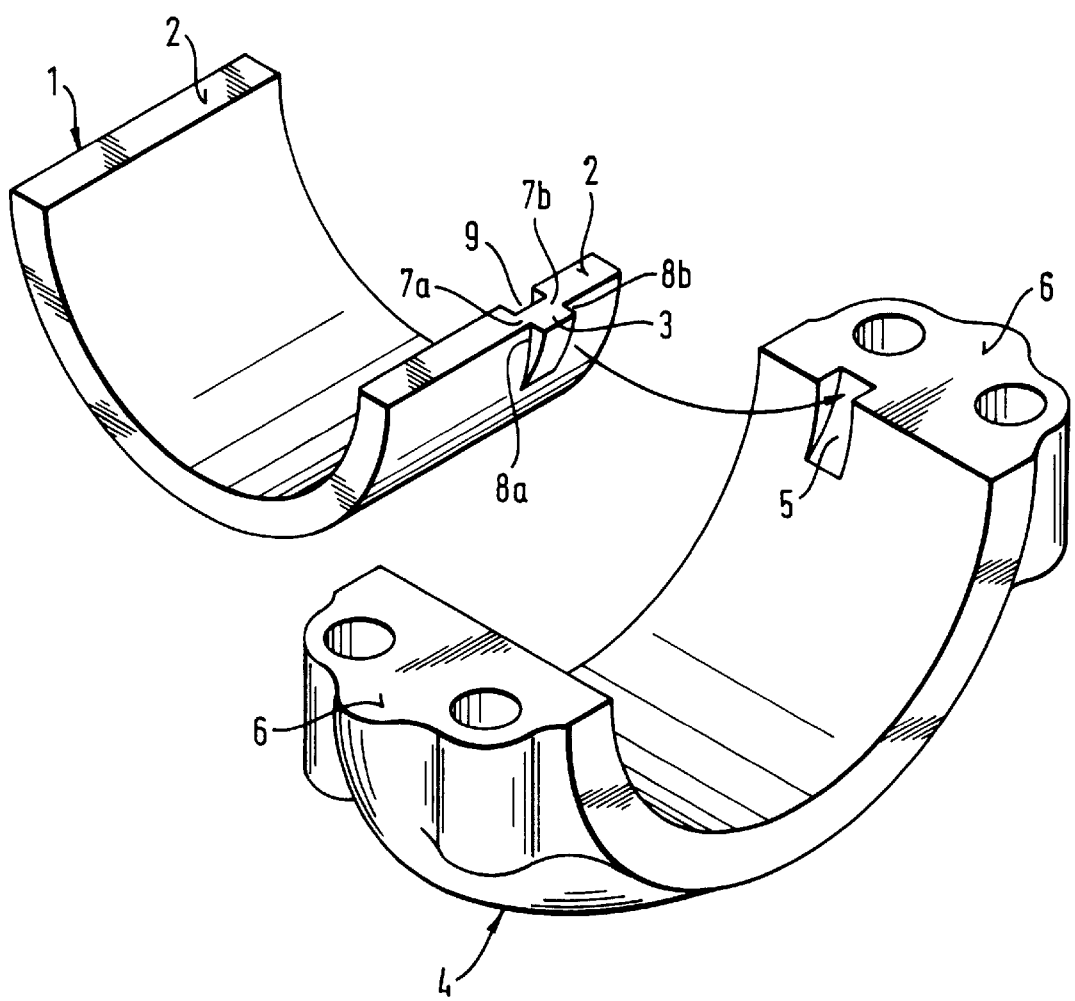
FIG. 1 is a schematic, perspective partial representation of a plain bearing shell with retaining cams and a bearing housing with milled-out portion according to the prior art.

FIG. 2 shows a bearing shell 10 having an accurate, half shell configuration terminating at edge or partial surfaces 20 at its circumferential ends and comprising a retaining cam 30 a having a rectangular outer contour and an indentation 13 with round contour. The embodiment shown is an embodiment according to the invention using a bearing with thrust flanges 11 (flanged bearing). It goes without saying that the invention also relates to bearing shells without thrust flange (smooth bearings).

In FIG. 3, the plan view of the partial surface 20 of the bearing shell 10 is shown on an enlarged scale. The retaining cam 30 projects radially outwardly of the shell 10 and has a width $B_N$, which corresponds approximately with the width $B_v$ of the indentation 13. The indentation 13 has straight lateral portions 15a,b which extend from the edge 16a,b to the round portion 14. The maximum depth T of the indentation 13 is to be found in the area of the cam center M. The width $B_{\bar{u}}$ of the transition area 70a,b, which extends from the cam base 17a, 17b to the indentation 13, corresponds, in the illustration given here, to less than half the bearing wall thickness D. The width of the transition area may also be markedly larger, however, depending on the construction.

As best illustrated in FIG. 3, the transition region 70a, 70b, as measured perpendicular to the outer surface of the shell and parallel to the lateral portions 15a, 15b from the center M of the indentation 13 to the outer surface of the shell 10 at the base of the cam 17a, 17b, has a positive width or thickness equal to the width $B_{\bar{u}}$. As such, the indentation 13 at the center M is spaced from the outer sur 17a, 17b of the shell, such that the center M of the indentation does not extend outwardly beyond a line extending through the transition region 70a, 70b containing the outer surface 17a, 17b and is spaced inwardly therefrom.

During the production of bearing cams, which may be carried out with a round blade, the steel backing is pressed into a corresponding die with rectangular contour. The overlay 12 is pressed carefully outwards, wherein this material lines only the round portion 14 of the indentation. In the area of the lateral portions 15a, 15b, the overlay 12 is interrupted.

Obviously, many modifications and variations of the present invention are possible in the light of the above teachings. It is, therefore, to be understood that within the scope of the appended claims, wherein reference numerals are for convenience and not to be considered in any way limiting, the invention may be practiced otherwise than as specifically described.

What is claimed is:

1. A bearing shell having a partial edge surface and at least one retaining cam formed on said partial edge surface having a predetermined width characterized by said retaining cam having a generally rectangular outer surface contour when said partial edge surface is viewed in plan and including an associated indentation provided on an inner surface of said shell opposite said outer surface contour, said indentation having laterally opposite lateral portions which are substantially flat and parallel and a rounded portion extending between said lateral portions, said rounded portion having a continuously curving surface with a depth that increases continuously across said width of said cam from said lateral portions to a center of said indentation and having a greatest depth at said center.

2. The bearing shell of claim 1 wherein said indentation has a predetermined width corresponding to said width of said cam.

3. A bearing shell having a predetermined wall thickness between an inner and outer surface of said shell, said shell including a retaining cam projecting outwardly from said outer surface adjacent a partial edge surface of said shell, said retaining cam having a rectangular outer surface contour with laterally opposite edges and an indentation provided on said inner surface of said shell opposite said outer surface, said indentation having laterally opposite lateral portions which are substantially flat and parallel to one another and a rounded portion extending between said lateral portions, said rounded portion having a continuously curving surface with a depth that increases continuously from said lateral portions to a center of said indentation, and having a greatest depth at said center, said shell including a transition region on said partial edge surface between said indentation and said outer surface of said shell, said transition region having a positive width between said center of said indentation and said outer surface of said shell such that said center of said indentation is spaced from an extension of said outer surface of said shell across said transition region at said partial edge surface of said shell.

4. A method of fabricating a bearing shell having a partial edge surface extending between an inner surface and an outer surface of the shell and including at least one retaining cam projecting outwardly from the outer surface of the shell, said method comprising pressing the inner surface of the shell outwardly to displace a small portion of the bearing shell wall into a rectangular die to provide the retaining cam with an outer contour that is correspondingly rectangular, and simultaneously forming an indentation on the inner surface of the shell opposite the cam which includes laterally opposite lateral portions which are substantially flat and parallel to one another and a rounded portion extending between the lateral portions having a continuously curving surface with a varying depth which increases continuously from the opposite lateral portions thereof to a center of the indentation when said partial edge surface is viewed in plan and having the greatest depth at the center of the indentation.

5. The method of claim 4 wherein the outward pressing of the bearing wall is performed by forcing a rounded forming tool outwardly against the inner surface of the shell to simultaneously form the rectangular retaining cam and varying depth indentation.

6. The method of claim 4 wherein the indention is formed by impact operation.

7. The method of claim 4 wherein the indentation is formed by an embossing operation.

* * * * *

UNITED STATES PATENT AND TRADEMARK OFFICE
CERTIFICATE OF CORRECTION

PATENT NO. : 6,227,709 B1  
DATED : May 8, 2001  
INVENTOR(S) : Lehmann et al.

It is certified that error appears in the above-identified patent and that said Letters Patent is hereby corrected as shown below:

Column 2,  
Remove lines 27-31, "This object is achieved with a bearing shell according to claim 1. The production method constitutes the subject of matter of claim 7. Advantageous embodiments are described in the subclaims."  
Line 64, change "$B_v$" to -- $B_V$ --.

Column 3,  
Line 26, change "accurate" to -- arcuate --.  
Line 40, change "$B_v$" to -- $B_V$ --.  
Lines 43 and 53, change "$B_u$" to -- $B_Ü$ --.  
Lines 54, change "sur" to -- surface --.

Signed and Sealed this

Thirtieth Day of October, 2001

Attest:

NICHOLAS P. GODICI  
*Attesting Officer*   *Acting Director of the United States Patent and Trademark Office*